(12) United States Patent
Sheldon et al.

(10) Patent No.: US 10,016,868 B2
(45) Date of Patent: Jul. 10, 2018

(54) DUST AND DEBRIS COLLECTION SYSTEM FOR WOODWORKING ROUTERS

(71) Applicant: WoodCraft Solutions LLC, Oregon City, OR (US)

(72) Inventors: Dwight Sheldon, Oregon City, OR (US); Kuldeep Singh, Oregon City, OR (US)

(73) Assignee: WoodCraft Solutions LLC, Oregon City, OR (US)

(*) Notice: Subject to any disclaimer, the term of this patent is extended or adjusted under 35 U.S.C. 154(b) by 0 days.

(21) Appl. No.: 15/399,037

(22) Filed: Jan. 5, 2017

(65) Prior Publication Data
US 2017/0197286 A1 Jul. 13, 2017

Related U.S. Application Data

(60) Provisional application No. 62/387,872, filed on Jan. 8, 2016.

(51) Int. Cl.
*B23Q 11/00* (2006.01)
*B23C 1/20* (2006.01)
(Continued)

(52) U.S. Cl.
CPC ........ *B23Q 11/0071* (2013.01); *A47L 7/0095* (2013.01); *B08B 15/04* (2013.01);
(Continued)

(58) Field of Classification Search
CPC ..... A47L 7/0095; A47L 9/02; B23Q 11/0866; B23Q 11/0046; B23Q 11/0042;
(Continued)

(56) References Cited

U.S. PATENT DOCUMENTS 3,786,846 A * 1/1974 Mehring ............ B23Q 11/0046
451/456
3,880,047 A * 4/1975 Dosier ............... B23Q 11/0046
409/137
(Continued)

FOREIGN PATENT DOCUMENTS

DE 1453203 A1 * 3/1969
DE 2261297 A * 6/1974
(Continued)

OTHER PUBLICATIONS

Machine Translation of JP 09-285939-A, which JP '939 was published Nov. 1997.*
(Continued)

*Primary Examiner* — Erica E Cadugan
(74) *Attorney, Agent, or Firm* — Howard Russell (57) ABSTRACT

A dust and debris collection system for use with woodworking routers, including a baffle, a dust collection hood, and a brush. The baffle includes a top surface, where the top surface is configured to deflect cooling air generated by a woodworking router out and away from the woodworking router in order to allow the woodworking router adequate cooling and efficient dust collection. The dust collection hood is located adjacent to the baffle and includes a sloped wall that is aerodynamically shaped to remove dust and debris and includes a central bit hole configured to accept a bit. The brush has a series of bristles extending from the dust collection hood. The brush and its bristles contain dust and debris.

12 Claims, 6 Drawing Sheets

(51) Int. Cl.
| | |
|---|---|
| *B27C 5/10* | (2006.01) |
| *A47L 7/02* | (2006.01) |
| *B08B 15/04* | (2006.01) |
| *A47L 7/00* | (2006.01) |
| *B27C 5/00* | (2006.01) |
| *B23Q 11/08* | (2006.01) |
| *B23C 1/02* | (2006.01) |

(52) U.S. Cl.
CPC ............ *B23C 1/02* (2013.01); *B23Q 11/0046* (2013.01); *B23Q 11/0866* (2013.01); *B27C 5/00* (2013.01); *B23C 1/20* (2013.01); *B27C 5/10* (2013.01); *Y10T 409/30392* (2015.01); *Y10T 409/304088* (2015.01); *Y10T 409/306608* (2015.01)

(58) Field of Classification Search
CPC . B23Q 11/005; B23Q 11/006; B23Q 11/0071; B27C 5/10; Y10T 408/50; Y10T 409/304088; Y10T 409/306216–409/306608; B08B 15/04
USPC ............ 409/175–182, 137, 134; 144/136.95, 144/154.5; 408/67; 451/453, 456; 15/415.1
See application file for complete search history.

(56) References Cited

U.S. PATENT DOCUMENTS

| | | | | |
|---|---|---|---|---|
| 4,037,982 A | * | 7/1977 | Clement | B23Q 11/006 409/137 |
| 4,742,855 A | * | 5/1988 | Hartley | B23Q 11/0046 409/137 |
| 5,411,433 A | * | 5/1995 | Keller | B24B 55/102 451/451 |

FOREIGN PATENT DOCUMENTS

| | | | |
|---|---|---|---|
| GB | 1329716 A | * | 9/1973 |
| JP | 09-285939 A | * | 11/1997 |

OTHER PUBLICATIONS

Dictionary Definition of "router", Merriam-Webster's Collegiate Dictionary, 10th ed., copyright 1998, p. 1021.*
Rockler Companies, Inc., Dust Boot for CNC Shark, posted at rockler.com, Copyright © 2013 Rockler Companies, Inc., [online], [site visited Nov. 14, 2017], 6 pages, available from Internet, <URL:https://web.archive.org/web/20131107025209/http://www.rockler.com/dust-boot-for-cnc-shark>.

* cited by examiner

DUST AND DEBRIS COLLECTION SYSTEM FOR WOODWORKING ROUTERS

CROSS REFERENCE TO RELATED APPLICATIONS

This application claims the benefit of U.S. Provisional Application, Ser. No. 62/387,872, filed on Jan. 6, 2016, which is hereby incorporated by reference for all purposes.

BACKGROUND

The present disclosure relates generally to woodworking routers. In particular, dust and debris collection systems that redirect cooling air flow while managing dust and debris are described for use with woodworking routers.

Woodworking routers are tools used to remove material from a hard workpiece, the workpiece typically being made of wood, plastic, or metal. To remove the material, the woodworking router uses a bit spun at high-speeds in order to cut out the material. As the bit cuts out the material, it cuts away at the material creating bits of debris including shavings, chips, and dust. These bits of debris can become a nuisance and a safety hazard. Because of the high rate of speed with which the router bit spins, the shavings, chips and dust can be spread a considerable distance in all directions from the router bit, creating a large mess for a user to clean. In addition, commonly available routers use a fan to cool the motor windings and blow the shavings, chips and dust away from the router motor and workpiece. The fan further spreads the debris, complicating collection and containment of the shavings, chips, and dust.

In addition to being a nuisance, the debris may also be a health hazard to the user of a router or observers in the area. For example, some materials may produce carcinogenic dust. This may be a potentially deadly hazard if the carcinogenic dust is inhaled. Additionally, debris may be thrown with a high velocity capable of causing injury to a user or observer. To protect themselves from personal injury while using a router, a user or observer will generally wear protective clothing, including a mask for protection against the dust, and goggles or glasses for protection against flying debris.

Known dust and debris collection systems implemented with woodworking routers are not entirely satisfactory for the range of applications in which they are employed. For example, current dust and debris collection systems may only surround a portion of the bit or router area to allow the bit to spin freely and move around the workpiece. However, these dust and debris collection systems leave part of the bit and work area exposed. This allows debris and dust to escape the collection system through the exposed area. In addition, the fan used to cool the motor and remove material from the bit area further spreads the debris away from the work area and additionally the current collection systems.

Thus, there exists a need for a dust collection system that prevents the router motor cooling air from blowing dust and debris away from the router. Additionally, there is a need for a dust collection system that acts as an engineered control to reduce risk from flying dust and debris hazards created by the router.

SUMMARY

The present disclosure is directed to a dust and debris collection system for use with woodworking routers. The collection system has a baffle, a dust collection hood, and a brush. The baffle includes a top surface, where the top surface is configured to deflect cooling air generated by a woodworking router out and away from the woodworking router in order to allow the woodworking router adequate cooling. The dust collection hood is located adjacent to the baffle. The dust collection hood includes a sloped wall that is aerodynamically shaped to remove dust and debris and a central bit hole configured to accept a bit. The brush has a series of bristles extending from the dust collection hood. The brush and its bristles contain dust and debris.

The collection system is capable of moving freely with a woodworking router to collect and remove dust and debris. The collection system is also interchangeable with multiple woodworking routers. In order to work with a woodworking router, the collection system includes an attachment mechanism located around a perimeter of the baffle. The attachment mechanism may include at least one tab with at least one hole, the tab extending from the perimeter of the baffle. A screw may be placed through the hole in the tab to attach the collection system to a woodworking router mount.

Furthermore, the top surface of the baffle is a surface of the sloped wall of the dust collection hood. As the baffle and the dust collection hood are adjacent to each other, they both utilize the sloped wall. The sloped wall is a conically shaped wall that contributes to the aerodynamics of the collection system. Located near the center of the conical sloped wall is an interior flange. The interior flange is cylindrically shaped and configured to surround the bit of the woodworking router. Further, the interior flange and the sloped wall include a notch or cutout that align with one another. The notch or cutout allows access to a router motor lock of a woodworking router while the collection system is attached to the woodworking router mount. With this access, a locking pin may be accessed and the bit interchanged without removing the collection system from the woodworking router.

The dust collection hood also includes a hood wall that surrounds a perimeter of the dust collection hood. Extending from the hood wall is a discharge port. The discharge port allows a vacuum system to attach to the collection system to allow the vacuum system to remove dust and debris. The discharge port may also include a screwdriver hole to allow a screwdriver to be inserted in order to access an attachment screw, if necessary. In order to keep the vacuum hose attached to the discharge port, there is at least one ridge on the discharge port. The ridge increases the friction or provides a compressive force that assists to hold the vacuum hose on to or inside the discharge port.

Turning to the brush, it includes a series of bristles that are flexible. The bristles may be long enough to contact a workpiece. These bristles attach to a detachable band. The detachable band may attach to the hood wall and surround a perimeter of the dust collection hood. By surrounding the dust collection hood, the bristles create a wall that is air permeable. With an air permeable wall, the vacuum can create the suction and air flow necessary to remove dust and debris.

DETAILED DESCRIPTION

The disclosed dust and debris collection system will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various dust and debris collection systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
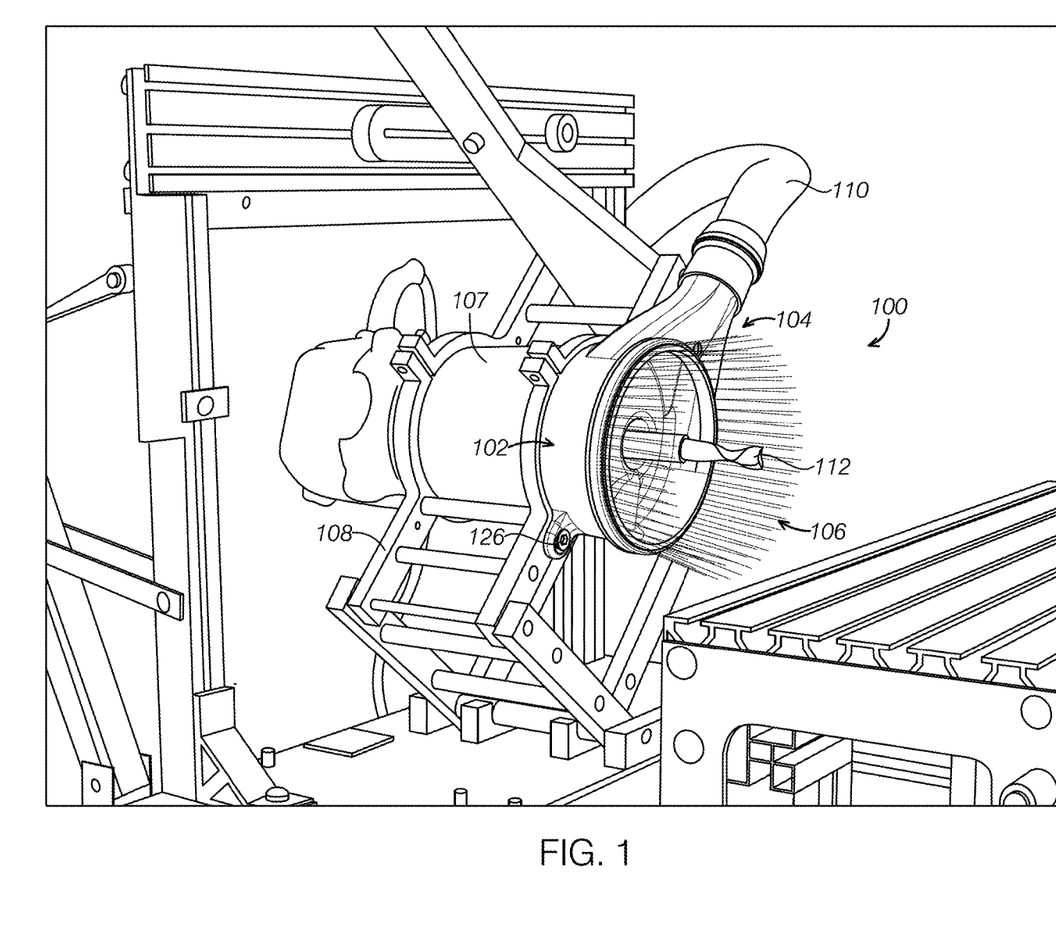
FIG. 1 is a perspective view of a first example of a dust and debris collection system as used with a woodworking router, and where a vacuum is attached to the dust and debris collection system.

With reference to FIGS. 1-6, a first example of a dust and debris collection system, collection system 100, will now be described. With reference to FIG. 1, collection system 100 includes a baffle 102, a dust collection hood 104, and a brush 106. Collection system 100 fits with a woodworking router 107 and attaches to a woodworking router mount 108 and a vacuum 110 to efficiently and effectively collect and control dust and debris created by the woodworking router 102.

Collection system 100 addresses many of the shortcomings existing with current dust and debris collection systems. For example, collection system contributes to a much safer environment, virtually free of dust and debris produced by the woodworking router 107. As bit 112 is spun at a high rate of speed and cuts at a material to remove portions of the material, it creates shavings, chips, and dust. Collection system 100 encompasses the bit and surrounding area with the collection hood 104 and brush 106, and any dust or debris created is contained and suctioned into the vacuum 110 attached to collection system 100. By containing and vacuuming the dust and debris, there is a reduced risk of injury by flying chips and shavings, and it is less likely that dust will be inhaled by a user or observer.

Collection system 100 also addresses the shortcoming of adequate airflow for cooling the woodworking router 107 and still containing dust and debris. Collection system 100 includes a baffle 102 that redirects cooling air produced by the woodworking router 107 in a direction away from the bit and the material. The redirected air is still adequate to cool the woodworking router, and dust and debris created by the bit is not spread because the work area is protected by the baffle 102. Baffle 102 additionally does not restrict access to the bit 112, allowing it to be interchanged without removal of collection system 100. Baffle 102 includes a small hole, notch, or void to allow the insertion of a finger or tool so the bit may be easily interchanged.

Collection system 100 may be made from any suitable material, including plastic. The plastic may be thermoformed or injection molded to make the shape of collection system 100. The brush 106 may also be made of any suitable material that is flexible and air permeable. In the following example embodiments of the invention, the brush 106 may be made of synthetic bristles, such as nylon, or natural bristles, such as hair.

Figure 2:
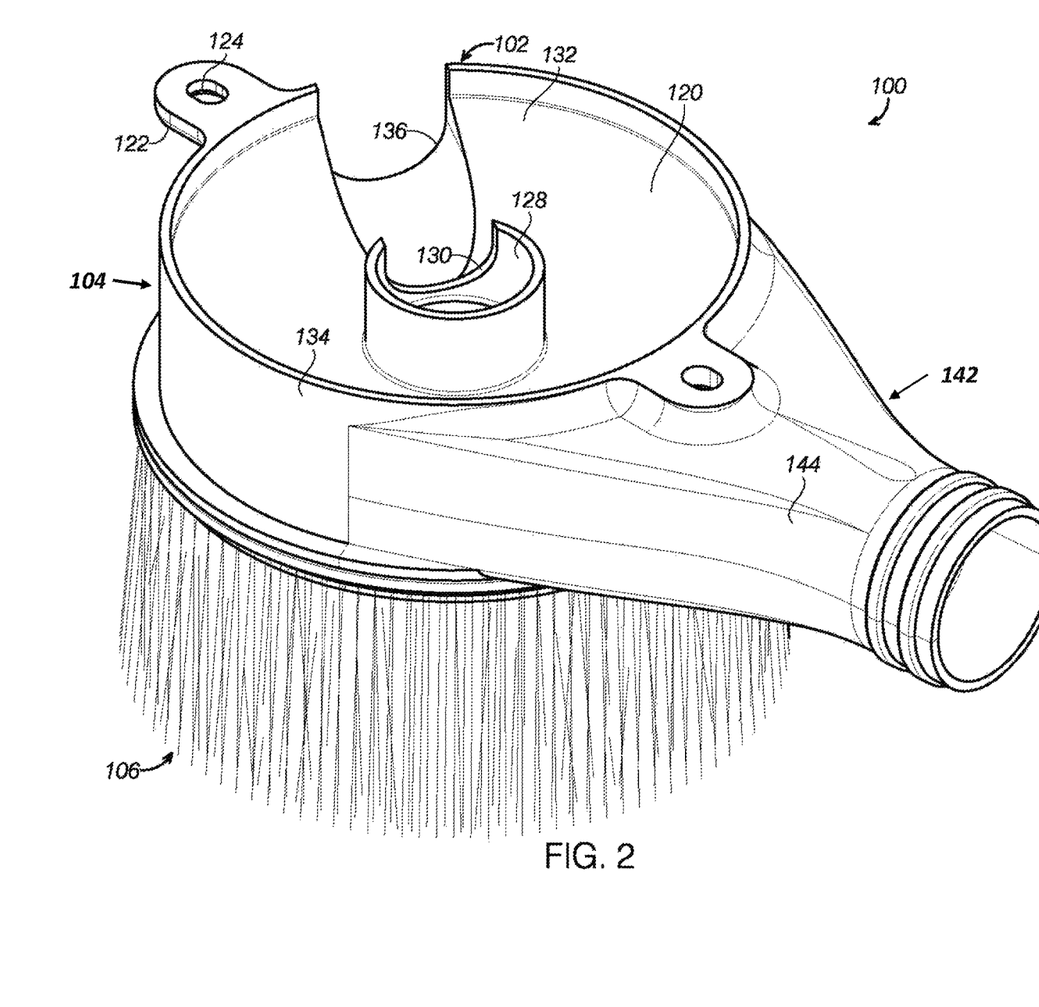
FIG. 2 is a perspective view of the dust and debris collection system shown in FIG. 1 detached from the woodworking router and the vacuum system.

Turning to FIG. 2, collection system includes a baffle 102, dust collection hood 104, and brush 106. The baffle 102 is located adjacent to the dust collection hood 104 such that the baffle 102 sits on top or directly above and in line with the dust collection hood 104. The brush 106 extends downward from the dust collection hood 104 and is attached to and around a perimeter of the dust collection hood 104.

Figure 3:
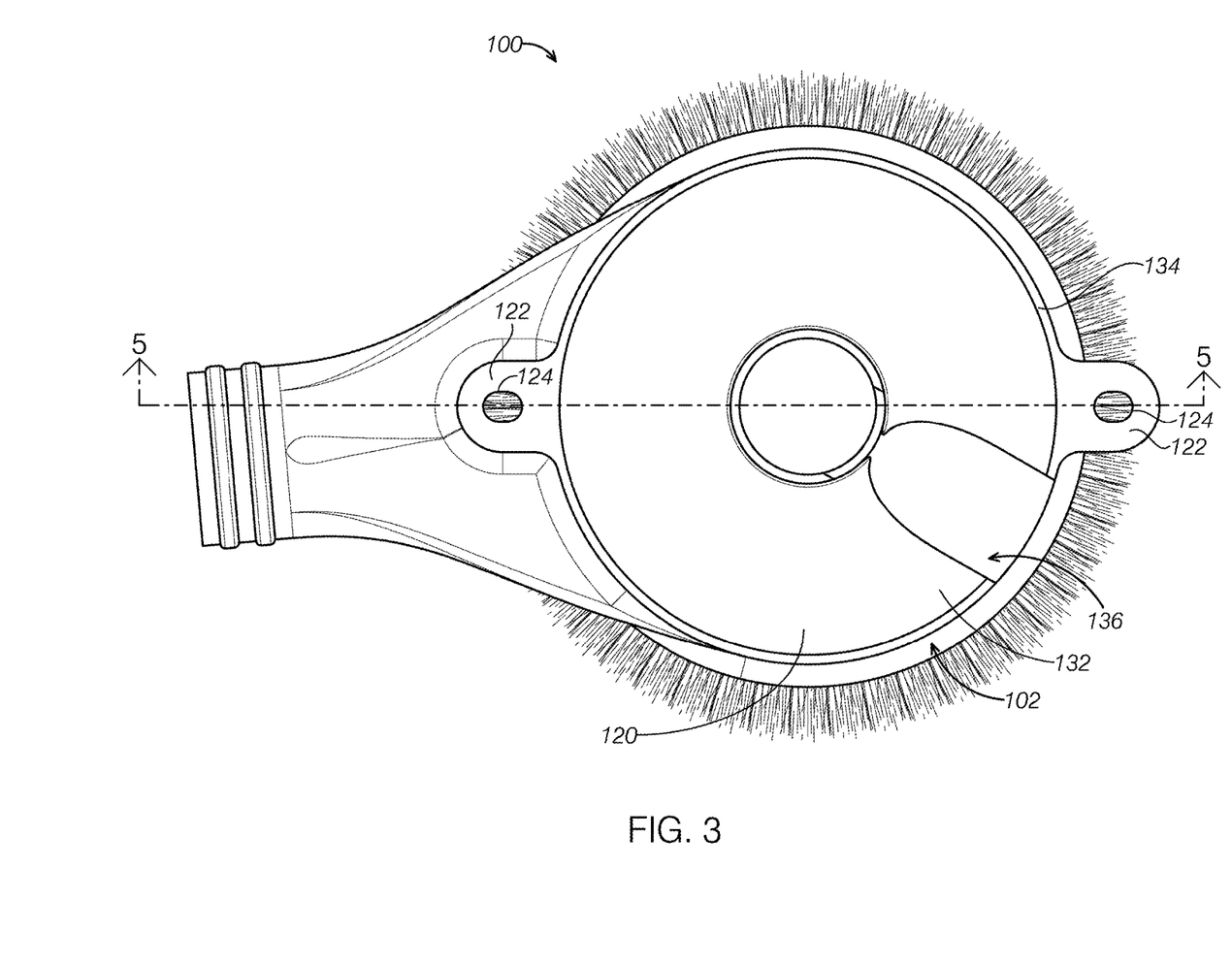
FIG. 3 is a top view of the dust and debris collection system shown in FIG. 1 depicting the overall shape of the collection system as well as a baffle for deflecting cooling air from the woodworking router.

As can be seen in FIG. 2, and better exemplified in FIG. 3, the baffle 102 may be located at a top end of the collection system 100. The baffle 102 may be configured to redirect cooling air from the woodworking router out and away from the bit and workpiece. The baffle 102, as shown in this example embodiment, may be substantially circular in shape, and may include a top surface 120 which is sized to cover or be placed near an end of a woodworking router to deflect the cooling air. The baffle 102 may include around its perimeter an attachment mechanism in order to attach to a woodworking router at a router holding mount or jig. In this example embodiment, the baffle 102 includes at least one tab 122 extending from the baffle 102. The tab 122 includes a tab hole 124 that extends completely through the tab 122. The tab 122 and tab hole 124 are sized and configured to accept a screw 126 in order to attach to the woodworking router mount 108, as exemplified in FIG. 1. In alternate embodiments of the invention, the tab 122 may include a snap, clamp, adhesive, or other attachment mechanism in order to attach to the woodworking router at various router holding mounts or jigs.

Referring to FIG. 3, the tab 122 and tab hole 124 extending through the tab 122 allow for collection system 100 to be attached to common woodworking routers, mounts, and jigs using a common screw. Likewise, the tab 122 and tab hole 124 allow for collection system 100 to be removed from a woodworking router and transferred to another woodworking router, allowing for the interchangeability of collection system 100 with multiple different jigs, routers, or machines. Because collection system 100 attaches to the woodworking router mount 108, as exemplified in FIG. 1, collection system 100 moves freely with the woodworking router 107, allowing for better maintenance, collection, and removal of dust and debris.

As seen further in FIG. 2 and FIG. 3, the baffle 102 may also include a barrier to separate the bit from the redirected cooling air. In this example embodiment, the baffle 102 may include an interior flange 128. The interior flange 128 may be a substantially cylindrical wall positioned near a center area of the baffle 102. The interior flange 128 surrounds the bit attached to the woodworking router 107 and is configured to redirect the cooling air away from the bit and the workpiece. The interior flange 128 may include a notch 130. Notch 130 may be a small cutout or void in the interior flange 128 to allow access to the bit while the collection system 100 is attached and in place on the woodworking router mount 108. In alternate embodiments of the invention, the interior flange 128 may not include a notch or void, and the interior flange 128 may be one uninterrupted piece.

Figure 4:
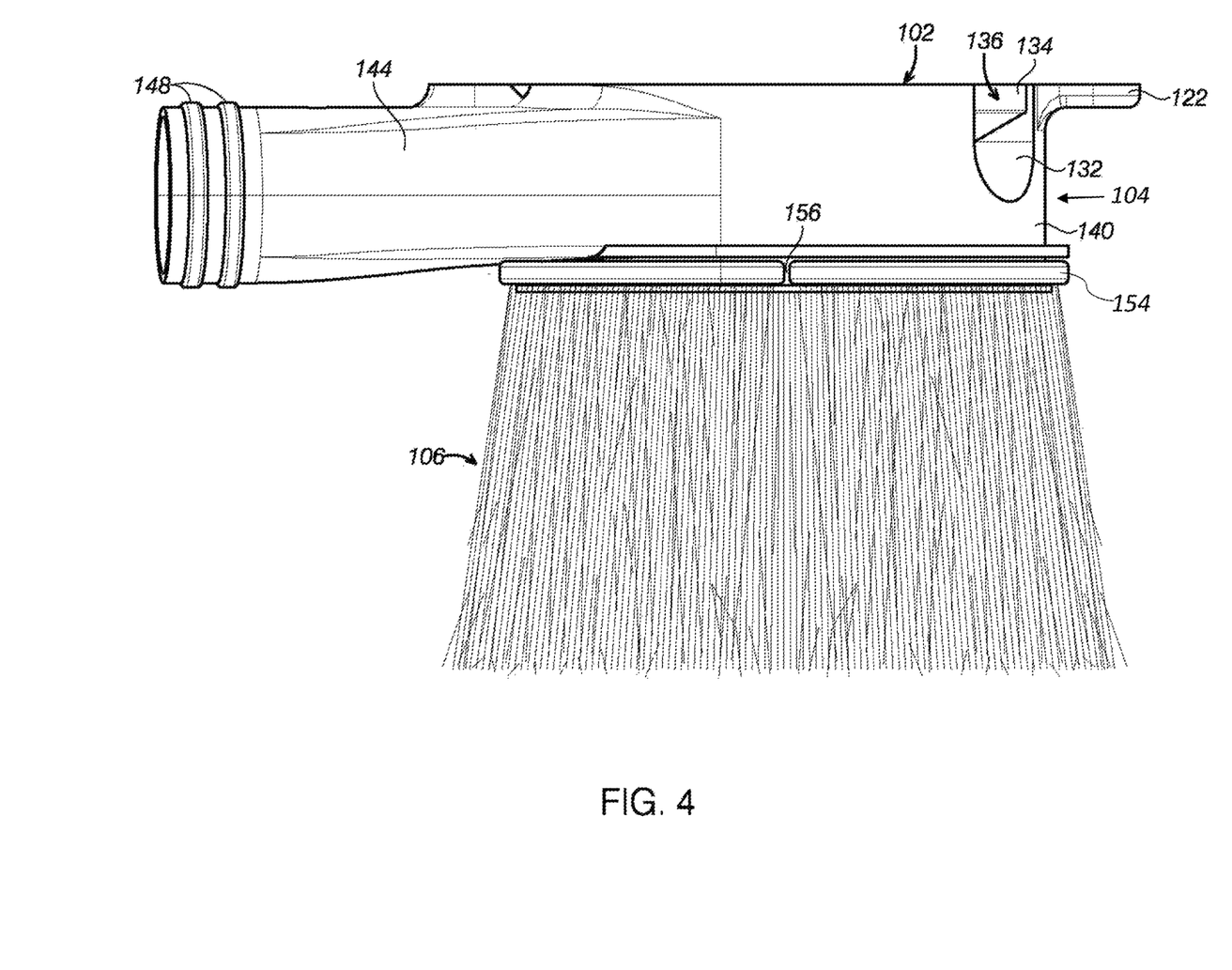
FIG. 4 is a side view of the dust and debris collection system shown in FIG. 1 depicting an opening to access a router shaft locking mechanism.

As seen in FIG. 4, the baffle 102 may be shaped to efficiently and effectively redirect the cooling air from the woodworking router 107. In this example embodiment, baffle 102 includes a sloped wall 132 on its interior that is substantially conical in shape. The baffle 102 also includes a sidewall 134 around the perimeter of the sloped wall 132 that extends from the sloped wall 132 outward toward the woodworking router when collection system 100 is attached. The interior flange 128 extends from a center portion of the sloped wall 132 outward toward the woodworking router when collection system 100 is attached. The sloped wall 132, sidewall 134, and interior flange 128 are configured to aerodynamically redirect any cooling air from the woodworking router that may be directed toward the bit and workpiece away from the bit and workpiece.

Referring back to FIG. 2, the sloped wall 132 and sidewall 134 may also include a cutout 136 which may be a notch, void, or other opening in the baffle 102. The cutout 136 is configured to efficiently and effectively redirect cooling air produced by the woodworking router. The cutout 136 of the sloped wall 132 and sidewall 134 allow for the cooling air to rapidly be moved from the woodworking router to the surrounding area away from the woodworking router and workpiece. In alternate embodiments, there is no cutout. In these alternate embodiments, the sloped wall 132 and sidewall 134 redirect the cooling air outward away from the woodworking router, directing the air in a direction perpendicular to the woodworking router. In these examples, the cooling air may also be directed away from the woodworking router through any spacing or gap between the baffle and the woodworking router.

Referring to FIG. 3 and FIG. 4, the baffle 102 of collection system 100 may be configured to allow for access to the bit and the lock or mechanism to interchange the bit. In this example embodiment of the invention, the notch 130 in the interior flange 128 and the cutout 136 in the sloped wall 132 and sidewall 134 are configured to allow a user to access and interchange the bit on the woodworking router 107. For many common woodworking routers, in order to change a bit, a user must use a finger or tool to loosen a locking nut or compress a button on the woodworking router adjacent to the bit. The notch 130 and cutout 136 are configured to allow a user to have access to the locking nut or button on the woodworking router adjacent to the bit. In this example embodiment of the invention, collection system 100 does not need to be removed from the woodworking router mount prior to interchanging bits. Instead, a tool or finger may be inserted into the notch 130 and cutout 136 in order to access the woodworking router 107 and change the bit while collection system 100 is still attached to the woodworking router mount 108.

Figure 5:
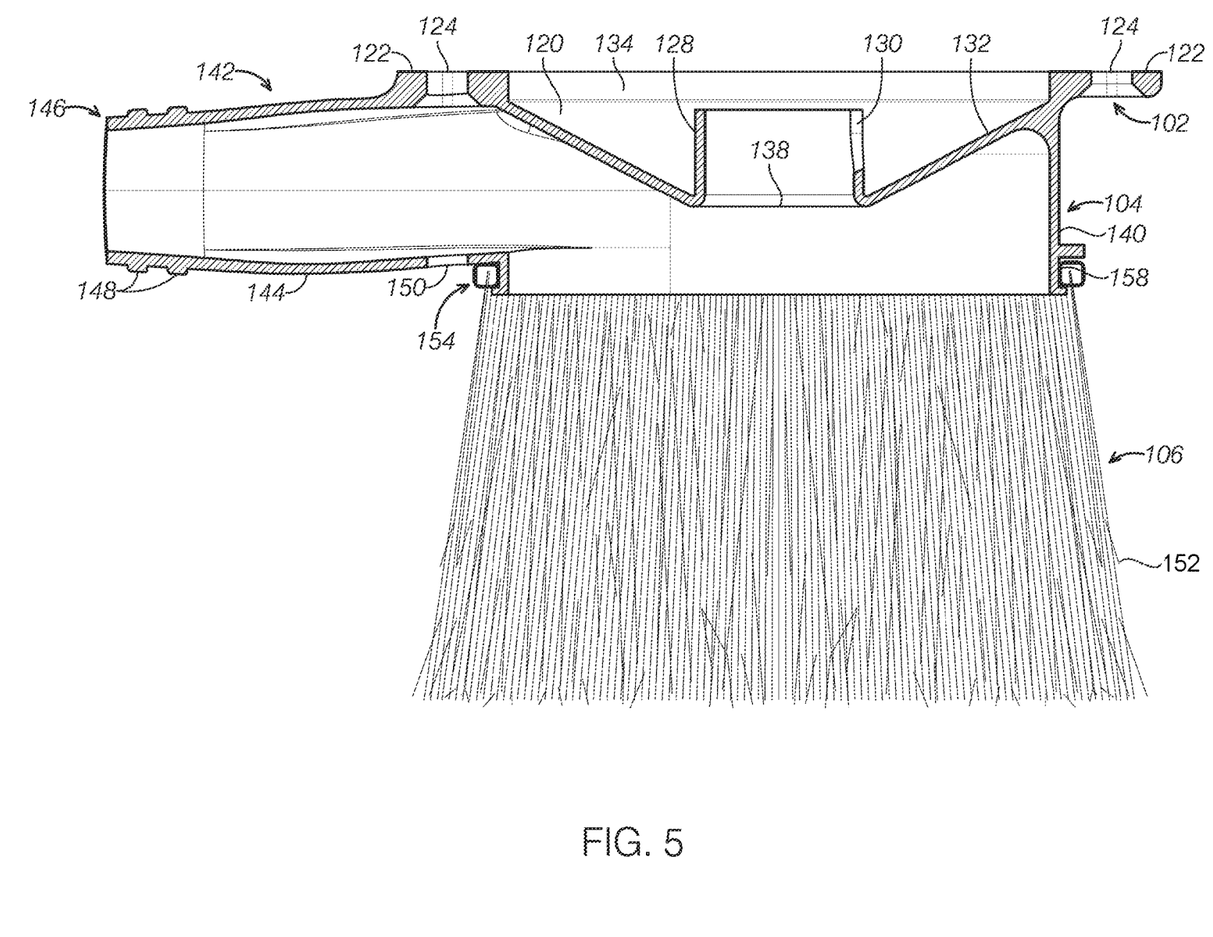
FIG. 5 is a cross-sectional view of the dust and debris collection system shown in FIG. 1 depicting the internal shape and structure of the internal baffle and dust collection hood.
Figure 6:
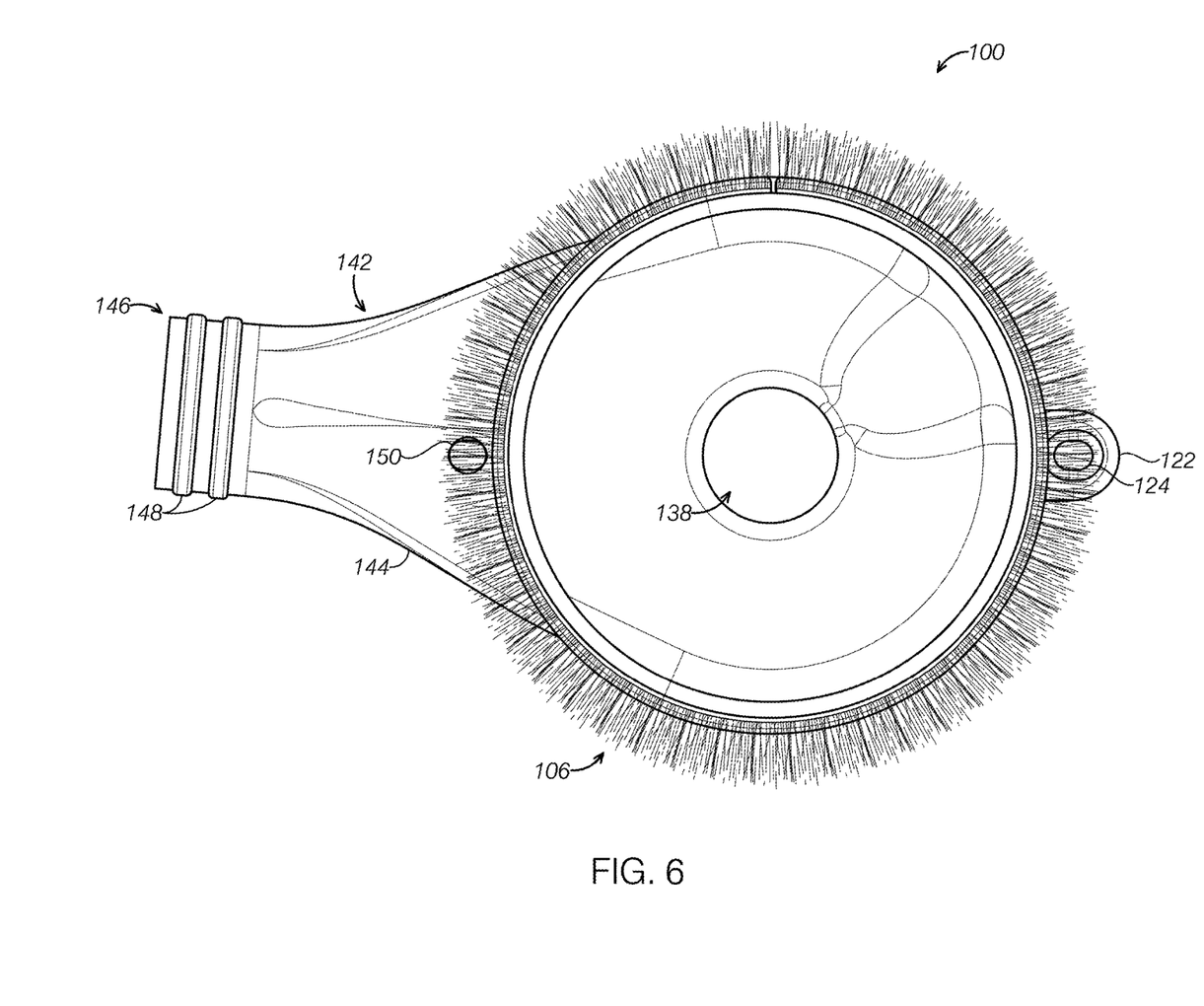
FIG. 6 is a bottom view of the dust and debris collection system shown in FIG. 1 depicting the internal, aerodynamic structure of a dust collection hood.

Turning now to FIG. 5, collection system 100 may include a dust collection hood 104. The dust collection hood 104 may be located adjacent to the baffle 102 and configured to contain and collect dust and debris created by the bit removing material from a workpiece. As can be seen in FIG. 6, the dust collection hood 104, in this example embodiment, may be substantially the same size and shape as the baffle 102. The dust collection hood 104 may include a central bit hole 138 where the bit 112 from the woodworking router 107 may extend through collection system 100 in order to reach the workpiece.

As exemplified in FIG. 5, the dust collection hood 104 may be shaped to efficiently and effectively collect, contain, and remove any dust and debris created by the bit of woodworking router 107. In this example embodiment, dust collection hood 104 includes the sloped wall 132 of baffle 102 on its interior that is substantially conical in shape. As seen in FIG. 4 and FIG. 5, the dust collection hood 104 may also include a hood wall 140 around the perimeter of the sloped wall 132. The hood wall 140 may extend from an edge of the sloped wall 132 toward the workpiece, away from the woodworking router. The hood wall 140 and sloped wall 132 are configured to effectively collect, contain, and remove any dust or debris created by the bit.

As can be seen in FIG. 5, and in reference to FIG. 6, the dust collection hood 104 may include a discharge port 142. The discharge port 142 is configured to connect collection system 100 to a vacuum in order to effectively and efficiently collect, contain, and remove dust and debris. In this example embodiment, the discharge port 142 may connect to the hood wall 140 with curved connection walls 144 that are configured to aerodynamically remove dust and debris from the dust collection hood 104.

As can further be seen in FIG. 5, the discharge port 142 may include a vacuum attachment end 146 configured to connect to a vacuum. In this example embodiment, the vacuum attachment end 146 is circular or cylindrical in shape, and is sized to be inserted into a vacuum hose or hose adaptor. The vacuum attachment end 146 may also include at least one ridge 148 extending out from an outer edge or side of the discharge port 142. The ridge 148 may be configured to provide friction or a squeezing, compressive force in order to secure a vacuum to the discharge port 142. In an alternate embodiment, the vacuum attachment end 146 may be configured and sized to fit over a vacuum hose. In this alternative embodiment, the at least one ridge 148 may be on an interior edge or side of the discharge port 142 and configured to provide friction or a compressive force on a vacuum hose that is inserted into the vacuum attachment end 146.

As seen in FIG. 6, the discharge port 142 may include a hole or way to access the attachment mechanism that attaches collection system 100 to a woodworking router mount 108. In this example embodiment, the discharge port 142 may include a screwdriver hole 150 in order to access the tab hole 124 on the tab 122. A screwdriver may be inserted into the screwdriver hole 150 in order to access and turn a screw that has been inserted through the tab hole 124. In alternate embodiments of the invention, the tab 122 may be located in a position away from the discharge port 142 such that a screwdriver hole is unnecessary to access the tab 122 and attachment mechanism.

Turning now to FIG. 5, and as exemplified in FIG. 6, collection system 100 may include a brush 106. The brush 106 may be located adjacent to the dust collection hood 104 and configured to contain and collect dust and debris created by the bit removing material from a workpiece while maintain airflow through the dust collection hood 104 in order to remove the dust and debris. The brush 106 may assist to direct dust and debris toward the dust collection hood 104 which may then aerodynamically remove the dust and debris through the discharge port 142.

As seen in FIG. 5, the brush 106 may be a series of long, flexible bristles 152 extending from and attached to a detachable band 154. The detachable band 154 may be a steel band that fits or attaches to a perimeter of the dust collection hood 104. In order to attach and detach from the dust collection hood, the detachable band 154 may include a slit 156 as shown in FIG. 4, where the slit allows the detachable band to flex and bend enough to fit into a groove 158 on the dust collection hood 104. The brush 106 may be removed and replaced for router bit changes and maintenance. Turning back to FIG. 5, the bristles 152 extend toward the workpiece and may be long enough to touch the workpiece while the bit removes material from the workpiece. The bristles 152 create an air permeable wall suitable to allow air to flow through. In alternate embodiments of the invention, the bristles 152 do not extend far enough to touch the workpiece while the bit removes material.

Referring to FIGS. 1-6, the dust collection hood 104 and the brush 106 may be configured to contain, collect, and remove dust and debris and not allow the dust and debris to escape into a surrounding space. In this example embodiment, to contain and remove dust and debris, a vacuum 110 may be attached to the vacuum attachment end 146 of the discharge port 142. When the vacuum 110 is turned on, it may create a suction or low pressure force within the discharge port 142 and the dust collection hood 104. The suction or low pressure force will draw in air from a higher pressure area outside the dust collection hood 104. The drawn in air may be drawn in through or around the bristles 152 of the brush 106, or through an opening at the end of the brush. Because of the aerodynamic shape of the dust collection hood 104, the drawn in air will be funneled into and through the dust collection hood 104 and the discharge port 142. Any dust or debris caught in this flow of air will be removed. Because the bit removes material from the workpiece within the airflow area adjacent to the brush 106 and dust collection hood 104, the removed material will be suctioned away from the workpiece and into the vacuum, effectively containing and removing the dust and debris.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A dust and debris collection system adapted for use with a router with a bit for working on a workpiece, the collection system comprising:
   a baffle comprising:
      a perimeter sidewall; and
      a sloped wall on the interior of said baffle, said sloped wall having a central bit hole formed therein adapted to accept the bit, said sloped wall being sloped with respect to said perimeter sidewall and having a surface extending from said perimeter sidewall to the central bit hole, said perimeter sidewall and said sloped wall having therein an opening, the opening being adapted to allow access to the router bit for changing the bit without removal of the baffle, said surface being adapted to redirect cooling air generated by the router away from the router and the workpiece through the opening;
   a dust collection hood located adjacent to the baffle, the dust collection hood comprised of:
      said sloped wall on the interior of said dust collection hood;
      a perimeter hoodwall connected to said sloped wall; and
      a discharge port connected to said perimeter hoodwall and adapted to connect said dust collection hood to a vacuum system to remove dust and debris from said dust collection hood during use of the router; and
   a brush having a series of bristles extending from the dust collection hood and configured to contain dust and debris.

2. The collection system of claim 1, further comprising a router, and wherein
   the collection system attaches to said router and moves with said router to collect and remove dust and debris.

3. The collection system of claim 1, further comprising a router and a router mount, said router being attached to said router mount, wherein the collection system is attached to said router mount and adapted to fit with the router, and wherein the collection system moves with the router and said router mount, and is adapted to allow removal of dust and debris with the vacuum system.

4. The collection system of claim 3, further comprising:
   an attachment mechanism further adapting the collection system for attachment to said router mount.

5. The collection system of claim 4, wherein the attachment mechanism further comprises:
   at least one tab extending from the baffle, the at least one tab having at least one hole extending completely through the at least one tab and sized and adapted to accept a screw to attach the collection system to the router mount.

6. The collection system of claim 1, wherein said sloped wall is substantially conical shaped around and relative to a central axis of rotation of the bit accepted by the central bit hole.

7. The collection system of claim 6, said sloped wall of said baffle further comprising:
   an interior flange extending from said sloped wall adjacent the central bit hole and adapted for surrounding the bit as a barrier to redirect air away from the bit.

8. The collection system of claim 7, wherein
   said interior flange includes a void, and
   wherein the void of said interior flange and the opening of said perimeter wall and said sloped wall align and are adapted to allow access to a router motor lock such that the bit may be interchanged without removing the collection system from the router.

9. The collection system of claim 1, said discharge port comprising:

at least one ridge, the at least one ridge extending out from said discharge port and configured to provide friction or a squeezing compressive force to secure said vacuum system to said discharge port.

10. The collection system of claim 1, wherein the series of bristles are flexible and adapted to contact a workpiece.

11. The collection system of claim 1, further comprising a detachable band and a perimeter of said dust collection hood, wherein the series of bristles of said brush attach to said detachable band, and wherein said detachable band attaches to said perimeter of said dust collection hood.

12. The collection system of claim 11, wherein the series of bristles create an air permeable wall capable of allowing air to flow through or around the series of bristles.

\* \* \* \* \*